US008453495B2

(12) United States Patent
Hanson et al.

(10) Patent No.: US 8,453,495 B2
(45) Date of Patent: Jun. 4, 2013

(54) TEST HEAD ASSEMBLY FOR USE IN TESTING PROTECTIVE MASKS

(75) Inventors: Eric Hanson, Ruxton, MD (US); Colin Gordon Hodge, Ellicott City, MD (US); Gary Warren McCurdy, Eldersburg, MD (US); Gilbert Olvera, New Windsor, MD (US)

(73) Assignee: Hamilton Associates, Inc., Owings Mills, MD (US)

( * ) Notice: Subject to any disclaimer, the term of this patent is extended or adjusted under 35 U.S.C. 154(b) by 321 days.

(21) Appl. No.: 12/923,583

(22) Filed: Sep. 29, 2010

(65) Prior Publication Data
US 2012/0073359 A1    Mar. 29, 2012

(51) Int. Cl.
*G01M 3/04* (2006.01)

(52) U.S. Cl.
USPC ............................................. 73/40

(58) Field of Classification Search
USPC ............... 73/40, 46, 49.2, 168, 40.7
See application file for complete search history.

(56) References Cited

U.S. PATENT DOCUMENTS

| 5,289,819 | A   | * | 3/1994  | Kroger et al. ............ 128/200.24 |
| 6,435,009 | B1  |   | 8/2002  | Tilley |
| 6,848,297 | B2  |   | 2/2005  | Tilley |
| 7,140,234 | B2  |   | 11/2006 | Tilley |
| 7,343,783 | B2  |   | 3/2008  | Tilley |
| 7,415,864 | B1  |   | 8/2008  | Israel et al. |
| 7,988,452 | B2  | * | 8/2011  | Eiwen et al. ................. 434/270 |

OTHER PUBLICATIONS

"TDA-99B Protective Mask Test System"; Air Techniques Inernational online brochure; Respirator/Mask Testor; pp. 1-3.
"Testing the Structural Integrity of the Air Force's Emergency Passenger Oxygen System at Altitude"; USDOT Federal Aviation Administration Final Report; Feb. 2000; pp. 1-12.
"Toward Inward Leakage Test for Half-mask Air-purifying Particulate Respirators" National Institute for Occupational Safety and Health (NOSH); Procedure No. PCT-APR-STP-0068; Jan. 31, 2007.
"PMLT Protective Mask Leakage Tester"; Air Techniques International; online brochure, pp. 1-2.
"Respiratory Mask Leak Tester NBC 04 Issue II"; IEICOS, Industrial Engineering Instruments brochure; pp. 1-4.
"Protective Mask Leakage Tester"; Air Techniques International brochure; pp. 1-2.
"Test Methodology Development for Individual Respiratory Protection Against VX"; Brochure NDIA 26th Annual National Test and Evaluation Conference, San Diego, CA; Mar. 2-4, 2010; pp. 1-10.

(Continued)

*Primary Examiner* — Daniel Larkin
*Assistant Examiner* — Jamar Ray
(74) *Attorney, Agent, or Firm* — Merek, Blackmon & Voorhees, LLC

(57) ABSTRACT

A test head assembly for supporting at least a portion of a protective mask to be tested for leaks. Preferably, the test head assembly includes a test head having a test space that is generally coextensive with an inner surface of the protective mask being tested. Although the test space is generally coextensive with the inner surface of the protective mask being tested, it is designed such that it has minimal volume to enhance the testing process by expediting test response time, reducing the time period it takes for a mask tester to reach one or more prerequisite test conditions, eliminate or greatly reduce lag time when the mask tester is operating in the probe mode and prevent dilution of challenge concentration. Preferably, the test head is formed from two or more removable sections to allow the size of the test head to be readily modified.

26 Claims, 7 Drawing Sheets

OTHER PUBLICATIONS

Delrin® 100AL-Delrin® 500AL Acetal resins with advanced lubrication; Delrin® only by Dupont brochure; Feb. 2003, pp. 1-4.
"NBC Protection Test it . . . and be sure!"; Air Techniques International brochure; Nov. 1995, pp. 1-4.
"Operator's Manual for the TDA-99M Respirator Function Tester"; Revision C, PN: 1800104 brochure; Air Techniques International; pp. 1-57.
U.S. Appl. No. 12/654,173, filed Dec. 11, 2009.

* cited by examiner

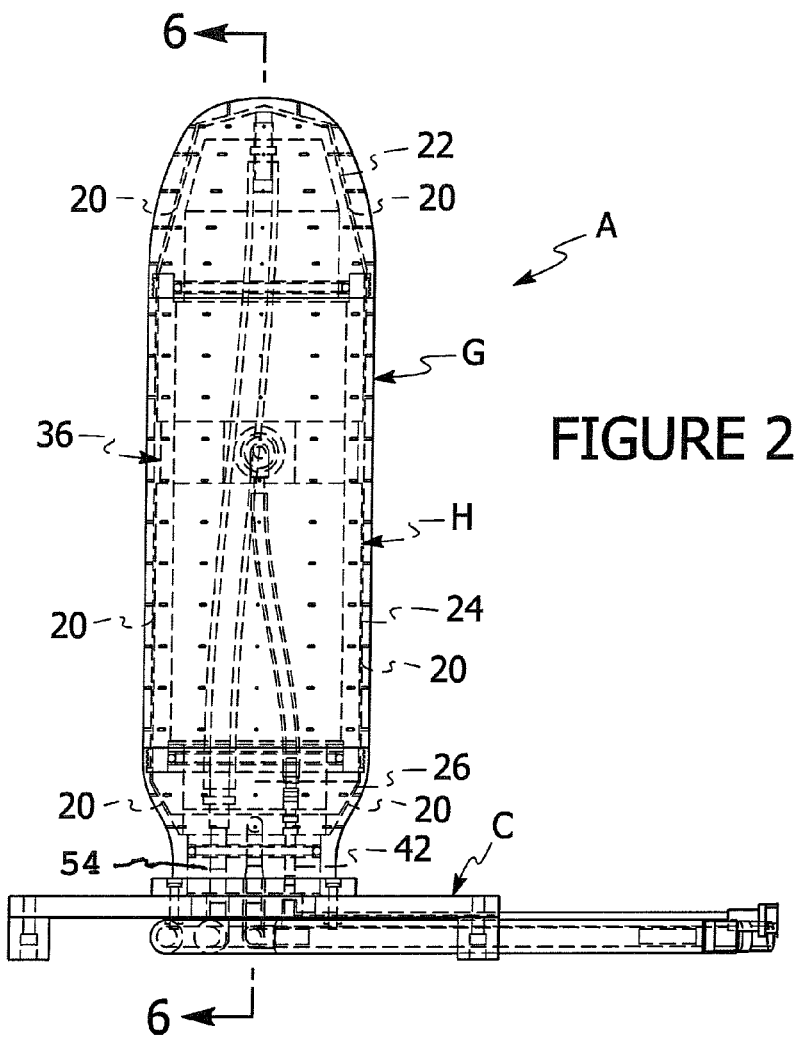
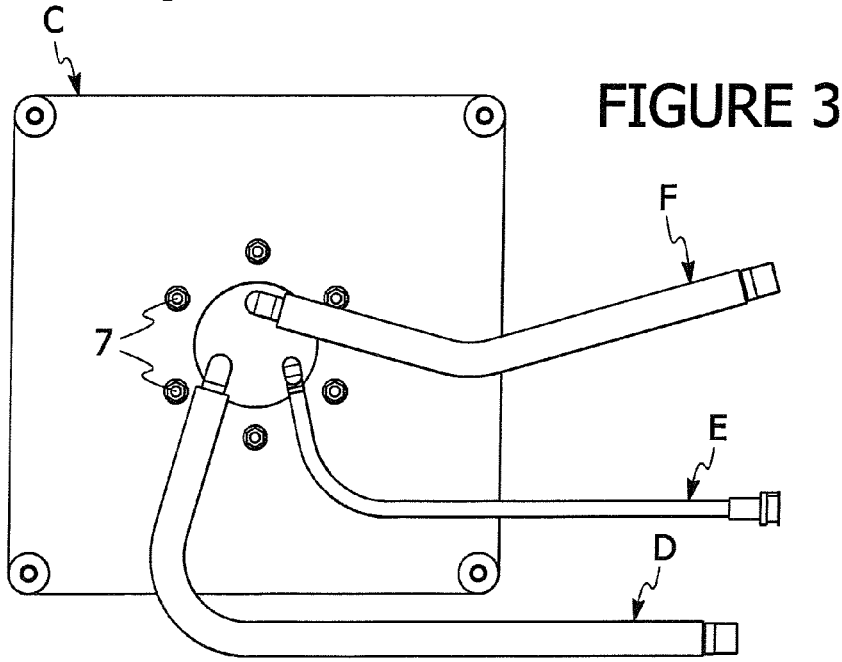

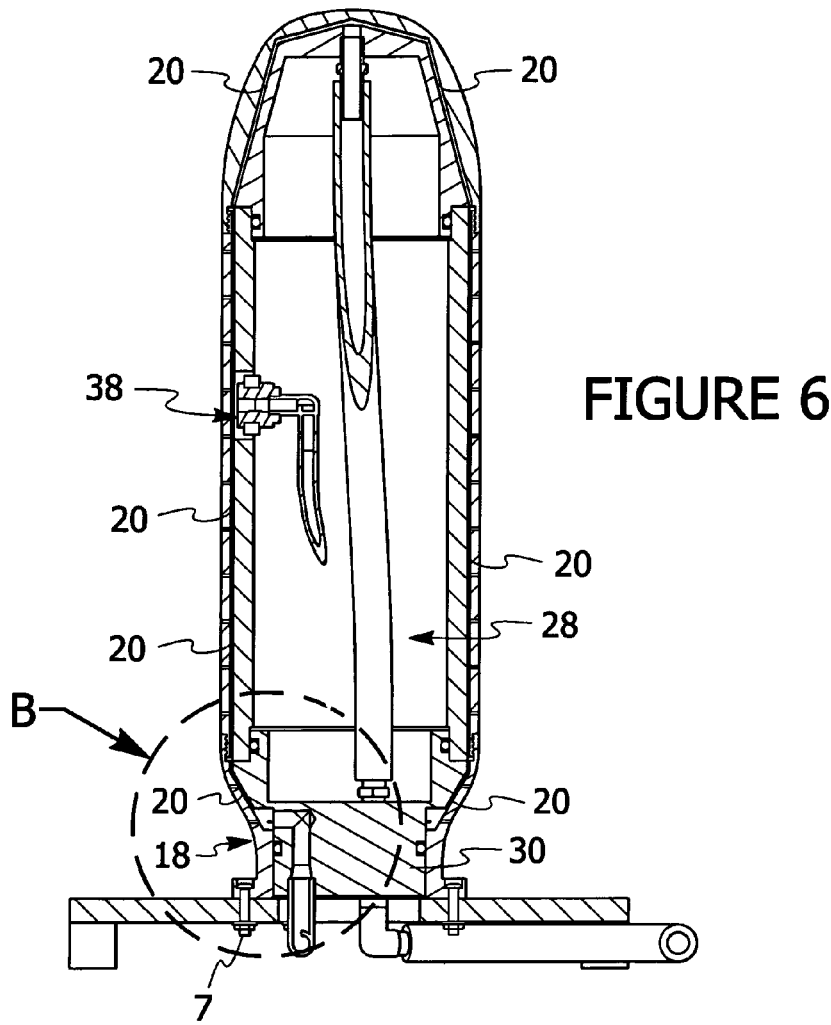
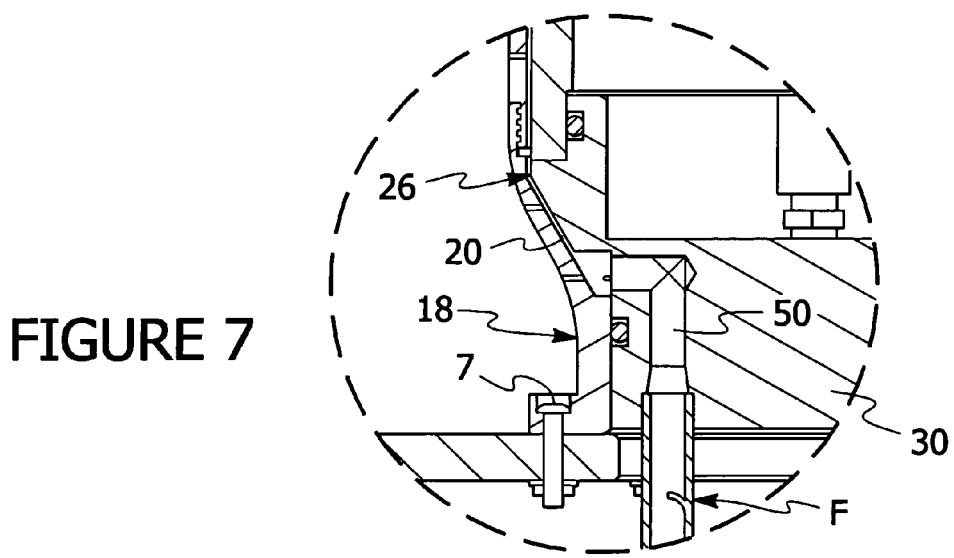

TEST HEAD ASSEMBLY FOR USE IN TESTING PROTECTIVE MASKS

FIELD OF THE INVENTION

The present invention is directed to a test head assembly or device for use with a mask tester to determine whether one or more leaks is present in one or more portions of a protective mask. The test head assembly can be used in testing military and commercial type protective masks. The test head assembly of the present invention may be used with a multitude of different mask testers including but not limited to mask testers utilizing the following testing techniques: (i) challenge concentration; (ii) vacuum or pressure decay; (iii) controlled negative pressure while monitoring flow; and (iv) ultrasonic.

BACKGROUND OF THE INVENTION

Protective masks have been used for sometime in both civilian and military applications. These protective masks are designed to protect the wearer from nuclear, biological, chemical agents, fumes, aerosols, gases and airborne contaminants. Hence, it is extremely important that the mask be properly tested to ensure that it will protect the wearer from these life-threatening agents.

It is often advantageous to test a protective mask without the protective mask being worn by an individual. Therefore, previously known mask testers have employed test heads about which a protective mask is mounted for testing. The disadvantages inherent in previously known test heads can have dramatic and adverse impacts on the mask testing process as explained below.

Previously known test heads used to test protective masks have been purposely designed to replicate the form of the corresponding region of the human head and neck. For example, test heads for face seal type protective masks take on the form of a human face while test heads for neck seal type protective masks replicate the human head and neck. Conventional wisdom of forming the test head such that the test head closely resembles the corresponding portion of the human body has significant and dramatic adverse consequences on the protective mask testing process. For example, test heads previously used to test neck seal type protective masks do not allow a neck seal type protective mask to be readily and properly installed over the test head. Rather, it is relatively time consuming and cumbersome to mount a neck seal type protective mask about previously known test heads configured to closely replicate the human head and neck region. This significant disadvantage severely limits the number of masks that can be tested in a given time interval. Further, it is not uncommon for a protective mask to be mounted about a conventional test head in such a manner as to prevent detection of a leak that is present in the mask, i.e., a fold could be present in the protective mask mounted on a conventional test head preventing detection of a leak located adjacent the fold.

Previously known test heads, also have significant and undesirable consequences of prolonging the period the mask tester takes to reach one or more prerequisite conditions (e.g., time to achieve a predetermined negative vacuum level before performing the leakage test), prolonging the response time (i.e., the time to determine whether a mask has passed or failed a given test once the test has been initiated) of the mask tester, dilution of the testing substance (e.g., challenge concentration) and creating an unacceptable lag time when a mask tester is in the probe mode.

Typically, the size of previously known test heads cannot be modified. Rather, where the size of the test head will not accommodate a particular size of protective mask, the test head must be removed from the mask tester and replaced with a differently sized test head. Thus, it is often the case that multiple test heads are required with a given mask tester to test differently sized protective masks.

OBJECTS AND SUMMARY OF THE INVENTION

An object of the present invention is to provide a novel and unobvious test head assembly for use in testing protective masks.

Another object of a preferred embodiment of the present invention is to provide a test head assembly for use in testing protective masks that allows a protective mask to be readily and properly mounted about the test head assembly.

A further object of a preferred embodiment of the present invention is to provide a test head assembly designed to allow the mask tester to more rapidly reach a prerequisite test condition, e.g., 6 inches of vacuum.

Yet another object of a preferred embodiment of the present invention is to provide a test head assembly that greatly improves the response time of the mask tester.

Still a further object of a preferred embodiment of the present invention is to provide a test head assembly that virtually eliminates lag time when the mask tester is in the probe mode to ensure that the location of a leak in the mask can be precisely ascertained.

Still another object of a preferred embodiment of the present invention is to provide a test head assembly that prevents dilution of the test substance.

Yet still another object of a preferred embodiment of the present invention is to provide a test head assembly designed to allow the size of the test head to be readily varied without removing and replacing the entire test head.

It must be understood that no one embodiment of the present invention need include all of the aforementioned objects of the present invention. Rather, a given embodiment may include one or none of the aforementioned objects. Accordingly, these objects are not to be used to limit the scope of the claims of the present invention.

In summary, one embodiment of the present invention is directed to an apparatus for use in testing a protective mask for leaks. The apparatus includes a test head assembly for supporting at least a portion of a protective mask to be tested for leaks. The test head assembly includes a body having an outer circumferential surface, an inner surface and a test space formed between the outer circumferential surface and the inner surface. The outer circumferential surface substantially surrounds the test space. The test space substantially surrounds the inner surface. The outer circumferential surface has at least one opening for allowing fluid located about the outer circumferential surface to flow into the test space. The body has a fluid pathway. The fluid pathway is in fluid communication with the test space at one end and in fluid communication with a mask testing device at the other end to allow fluid in the test space to be directed through the fluid pathway to the mask testing device for analysis to determine if a leak exits in the protective mask being tested.

Another embodiment of the present invention is directed to an apparatus for use in testing a protective mask for leaks. The apparatus includes a test head assembly for supporting at least a portion of a protective mask to be tested for leaks. The test head assembly includes a body about which a protective mask is mounted for testing the protective mask for leaks. The body has a generally tubular mid-section having an outer surface. The body has a hollow cavity. The body further includes a test space disposed between the outer surface and the hollow cavity.

A further embodiment of the present invention is directed to an apparatus for use in testing a protective mask for leaks. The apparatus includes a test head assembly for supporting at least a portion of a protective mask to be tested for leaks. The test head assembly includes a body having an outer shell, an inner core and a test space formed between the outer shell and the inner core. The outer shell has a hollow cavity. The outer shell is removably mounted about the inner core.

A still further embodiment of the present invention is directed to an apparatus for use in testing a protective mask for leaks. The apparatus includes a test head assembly having a body for supporting at least a portion of a protective mask to be tested for leaks. The body has at least a first section and a second section. The second section is substantially tubular and removably attached so that the second section can be readily removed from the test head assembly and replaced with a different body section having at least one dimension different from the second section such that the size of the body can be readily varied.

The above summary describes preferred forms of the present invention and is not in any way to be construed as limiting the claimed invention to the preferred forms.

BRIEF DESCRIPTION OF THE DRAWINGS

FIG. 2 is an elevational view of the preferred embodiment illustrated in FIG. 1.

FIG. 3 is a bottom view of the preferred embodiment illustrated in FIG. 1.

FIG. 6 is a cross-sectional view of the preferred embodiment illustrated in FIG. 1 taken along lines 6-6 in FIG. 2.

FIG. 7 is an enlarged cross-sectional view of the portion of the test head assembly identified by dashed circle B in FIG. 6.

DETAILED DESCRIPTION OF THE PREFERRED EMBODIMENT OF THE INVENTION

The preferred form of the test head assembly will now be described with reference to FIGS. 1-7. The appended claims are not limited to the preferred forms and no term and/or phrase used herein is to be given a meaning other than its ordinary meaning unless it is expressly stated otherwise. An optional test shroud that may be used in connection with the preferred form of the test head assembly will be described with references to FIGS. 8-10.

FIGS. 1 Through 7

Figure 1:
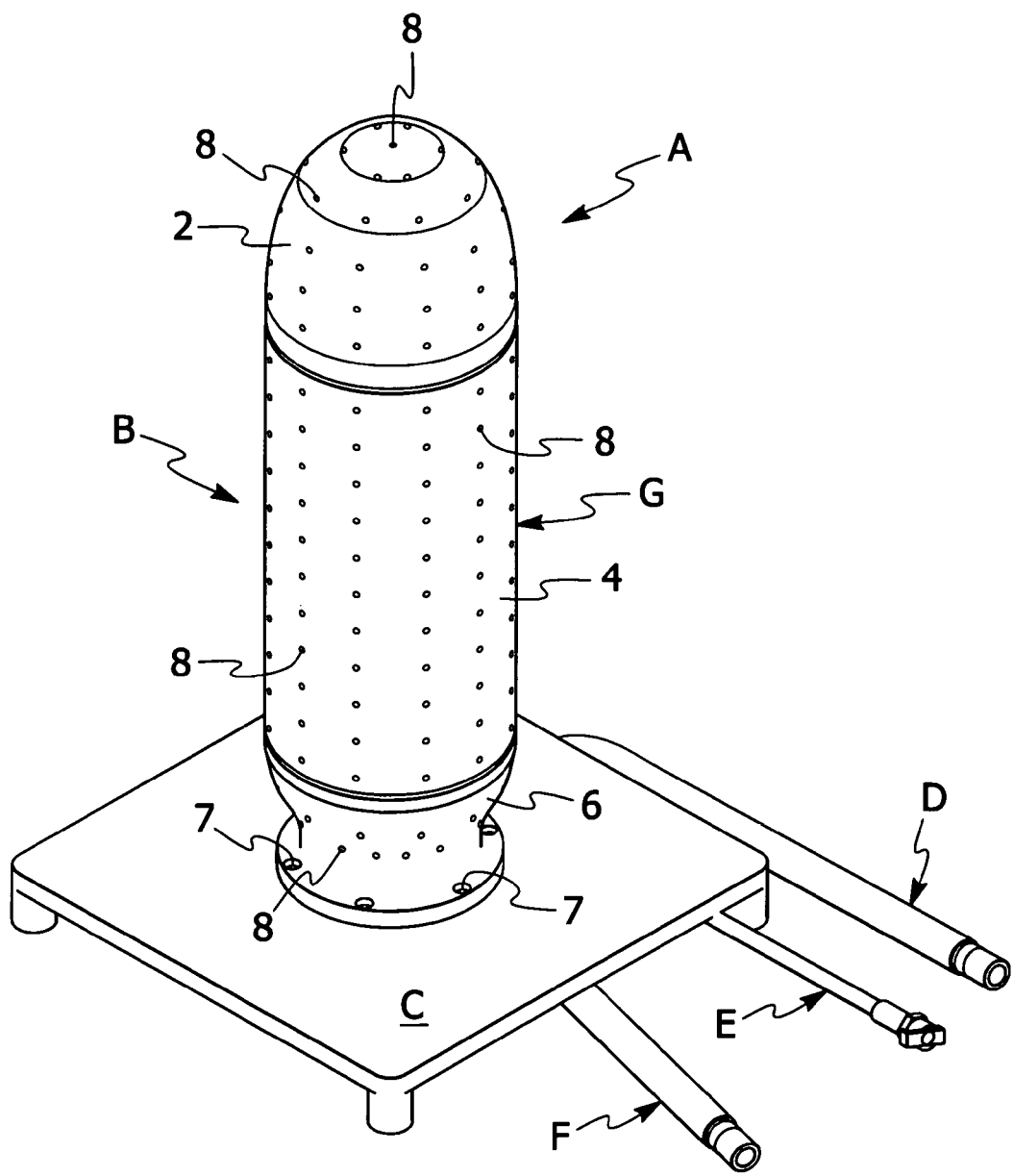
FIG. 1 is a perspective view a preferred embodiment of the present invention.
Figure 2A:
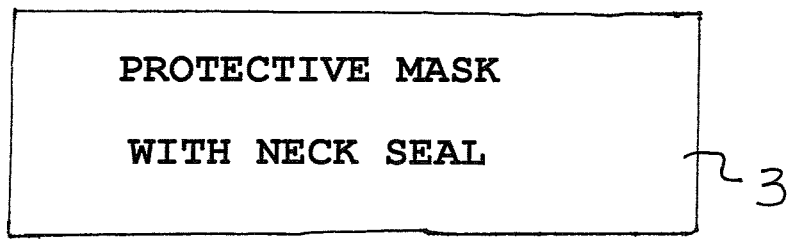
FIG. 2A is a schematic illustration of a protective mask with a neck seal.
Figure 2B:
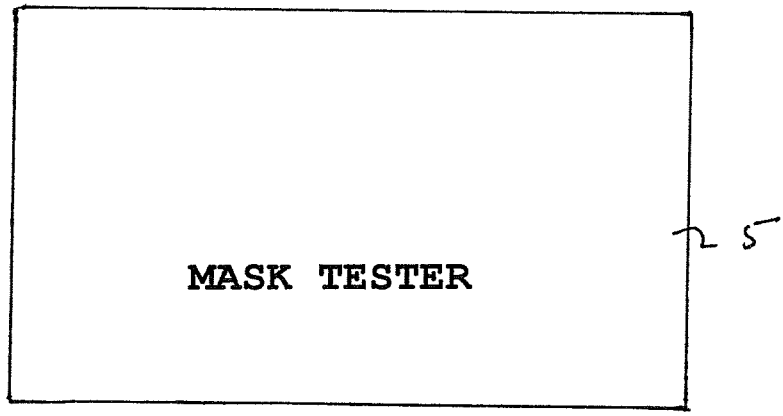
FIG. 2B is a schematic illustration of a mask tester.

Referring to FIG. 1, a preferred form of freestanding (i.e., a stand alone item that is operably connected to a mask tester 5 schematically illustrated in FIG. 2B) test head assembly A is illustrated. It should be noted that the present invention is not limited to a freestanding test head assembly. Rather, the present invention includes but is not limited to a test head assembly that is mounted on a mask tester. It should be further noted that the test head assembly of the present invention can be used with a multitude of different mask testers. By way of example only and not limitation, the test head assembly A may be used with the mask tester disclosed in U.S. Pat. No. 6,435,009. It should be further noted that the test head assembly A may be used with mask testers employing varying testing techniques including but not limited to: (i) detection of challenge concentration by a photometer, CNC device or other particle detection device; (ii) detection of pressure or vacuum decay; (iii) monitoring of fluid flow under controlled negative pressure; and (iv) ultrasonic testing techniques.

The preferred form of the test head assembly A includes a test head B, a base C and conduits D, E and F. It should be noted that the base C and conduits D, E and F may be entirely omitted in those instances where the test head assembly A is mounted directly on the mask tester.

Preferably, the test head B is configured to receive a neck seal type protective mask 3 schematically shown in FIG. 2A. However, it will readily understood that the test head B could be configured to receive other types of protective masks. Preferably, test head B includes an outer shell G and an inner core H as seen in FIGS. 1, 2, 4 and 5. In the most preferred form, the outer shell G and an inner core H are substantially silo or cigar shaped.

Figure 4:
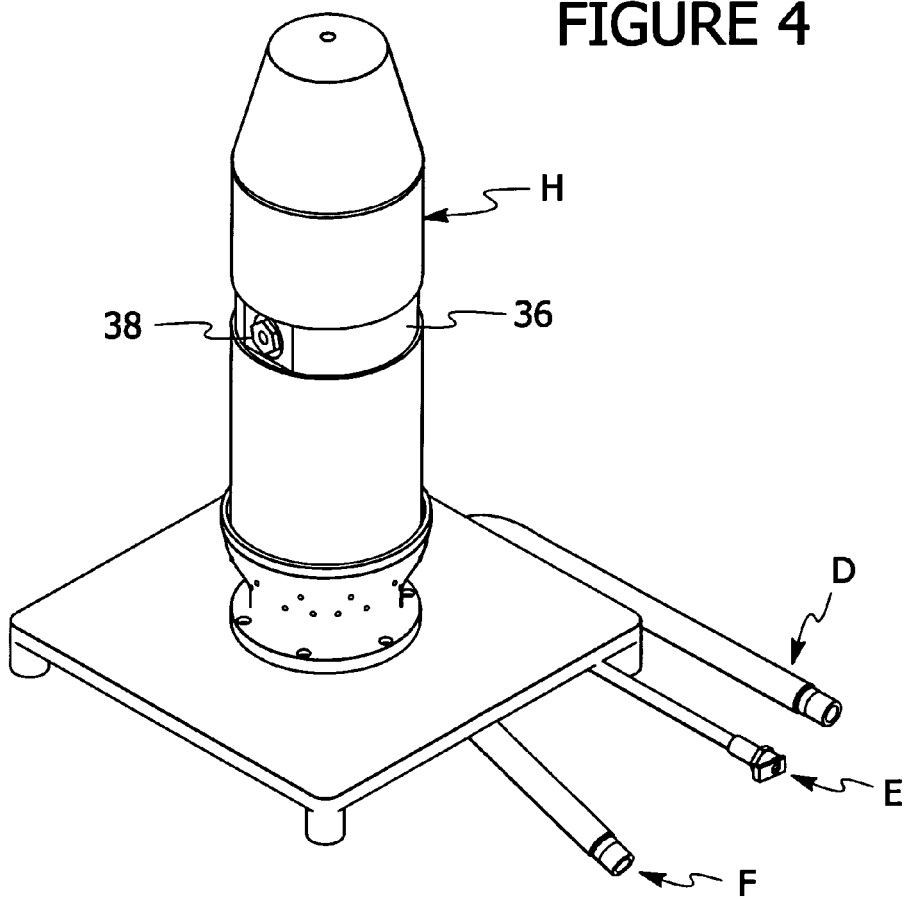
FIG. 4 is a partially exploded perspective view of the preferred embodiment illustrated in FIG. 1.
Figure 5:
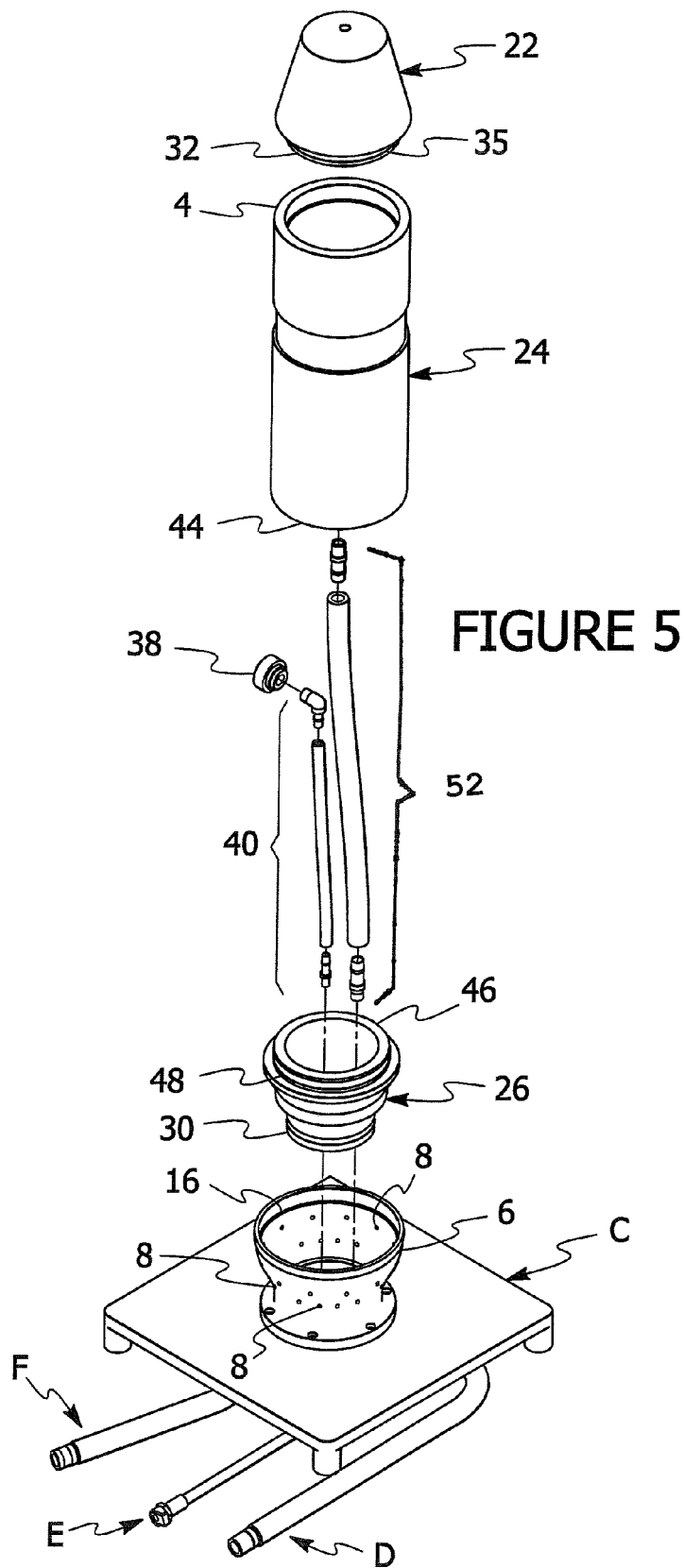
FIG. 5 is a partially exploded perspective view of the preferred embodiment illustrated in FIG. 1 with portions of the outer shell omitted for purposes of clarity.

Referring to FIGS. 1, 4 and 5, outer shell G includes a top section 2, a mid-section 4, and a bottom section 6. Bottom section 6 preferably is removably mounted on base C with screws 7 or other fasteners. Referring to FIGS. 1 and 5, each of top section 2, mid-section 4 and bottom section 6 include a plurality of openings 8. Preferably, top section 2 is dome or hemispherically shaped and mid-section 4 is generally tubular in configuration. This configuration allows a neck seal type protective mask to be mounted on test head B relatively easily and quickly. Further, this configuration prevents folds and/or pockets from forming in the protective mask to be tested. Hence, the preferred configuration of the test head allows more masks to be tested in a fixed period of time and further reduces the likelihood that a mask having a leak will go undetected.

It should be noted that while the preferred form of mid-section 4 is cylindrical, mid-section 4 could take the form of a square tube, rectangular tube, hexagonal tube, a triangular tube, an elliptical tube or other shaped tube. "Tubular" as used herein includes the aforementioned tubes as well as any other hollow object open at one or both ends where the height of the object is substantially equal to or greater than the width of the object. "Outer circumferential surface" as used herein includes an outer perimeter surface of an object. The surface need not be circular but rather includes any other shape provided the surface forms an outer perimeter of an object.

Referring to FIG. 4, upper portion 10 and lower portion 12 of mid-section 4 have external threads. Lower portion 14 of top section 2 has internal threads (not shown) for mating with external threads of upper portion 10 of mid-section 4 so that mid-section 4 and top section 2 are removably connected to each other. It should be noted that while threads are the preferred form of removably connecting mid-section 4 to top section 2, any suitable fastening device may be used. Referring to FIG. 5, upper portion 16 of bottom section 6 has internal threads for mating with external threads of lower portion 12 of mid-section 4 so that mid-section 4 and bottom section 6 are removably connected to each other. It should be noted that while threads are the preferred form of removably connecting mid-section 4 to bottom section 6, any suitable fastening device may be used.

Referring to FIGS. 5, 6 and 7, bottom section 6 includes an inwardly stepped or necked down portion 18 about which the neck seal of a neck seal type protective mask is secured in a sealed manner to test head B. An o-ring shaped clamping member (not shown) or other device may be used to securely connect the neck seal portion of the protective mask about portion 18 of test head B to create a fluid tight cavity between the inner surface of the protective mask to be tested and the outer surface of test head B.

By forming openings 8 along the length and around the circumference of each of the three sections of outer shell G, the test head assembly A is able to improve the chances that the mask tester will properly detect a leak in the protective mask regardless of where the leak may be formed in the protective mask.

It should be noted that while outer shell G is formed in three detachably connected sections, outer shell G may be formed as a one piece object. The outer surface of sections 2, 4 and 6 are preferably formed from a material having a low coefficient of friction to allow the protective mask to be readily slid over test head B. One suitable material is polyoxymethylene (POM). The silo or cigar shape of test head B is particularly useful when neck seal type protective masks are being tested. Specifically, this shape of the test head along with forming the outer surface from a material having a low coefficient of friction makes it relatively easy to secure the neck seal type protective mask to the test head. The necked down portion 18 of the outer shell G makes it easier to properly secure a protective mask to the test head B.

Referring to FIGS. 2 and 4, inner core H is disposed in the hollow cavity formed by outer shell G. A test space 20 is formed between the inner core H and the outer shell G. Test space 20 is in fluid communication with space formed between the inner surface of the protective mask being tested and the outer surface of shell G, via openings 8. Test space 20 is generally coextensive with the inner surface of outer shell G and the outer surface of inner core H. Hence, test space 20 in its preferred form is generally silo or cigar shaped. Preferably, the thickness of test space 20 is less than ⅛ of an inch and most preferably is approximately ¹⁄₁₆ of an inch. By forming test space 20 in this manner, the volume of the test space is able to be greatly reduced over previously know test heads including the test head disclosed in U.S. patent application Ser. No. 12/65,173. By reducing the volume of the test space and forming the test space to be generally coextensive with the inner surface of the outer shell G, the test head assembly A of the preferred embodiment of the present invention reduces the response time of the associated mask tester, allows the associated mask tester to more rapidly reach one or more prerequisite conditions, prevents dilution of the testing substance (e.g., challenge concentration) and avoids any significant lag time when a mask tester is in the probe mode.

Referring to FIG. 5, inner core H is preferably formed in three sections 22, 24 and 26. However, it is to be readily appreciated that inner core H may be formed as a single piece. Further, while inner core H and outer shell G are formed as separate pieces, it is to be readily appreciated that inner core H and outer shell G can be formed as a single piece.

Referring to FIGS. 2 and 6, sections 22, 24 and 26 preferably form a hollow cavity 28. Preferably, upper section 22 is a truncated cone, mid-section 24 is generally cylindrical and lower section 26 includes a stepped or necked down portion 30. Referring to FIG. 5, the lower portion 32 of section 22 has external threads that mate with internal threads formed on upper portion 34 of section 24 to removably connect upper section 22 to mid-section 24. While threads are the preferred manner of removably connecting section 22 to section 24, any suitable fastening device may be used. An annular ring type seal 35 surrounds portion 32 to form a fluid tight seal between section 22 and section 24.

Referring to FIGS. 2 and 4 to 6, an annular recess 36 is preferably formed in mid-section 24 about port 38. Referring to FIGS. 2 and 5, hose assembly 40 connects port 38 to fluid pathway 42 formed in portion 30 of lower section 26. Fluid pathway 42 in turn connects the hose assembly 40 to conduit E. Conduit E preferably is similar to conduit 60 disclosed in U.S. patent application Ser. No. 12/654,173. The entire contents of U.S. patent application Ser. No. 12/654,173 are incorporated by reference herein. Conduit 60 in U.S. patent application Ser. No. 12/654,173 and conduit E herein form one end of the inflation/deflation feature disclosed in U.S. patent application Ser. No. 12/654,173. The inflation/deflation feature will only be briefly described herein as it is fully described in the aforementioned U.S. patent application. After the mask has been mounted about the test head B but prior to testing the protective mask for leaks, the inflation/deflation feature disclosed in U.S. patent application Ser. No. 12/654,173 allows fluid under pressure (preferably air at 10 psi and 20 lpm)) to be supplied through conduit E, hose assembly 40, port 38, test space 20 and openings 8 to the space between the outer surface of shell G and the inner surface of the protective mask mounted on test head B to blow out any pockets or folds formed in the neck seal type protective mask mounted on test head B. Annular recess 36 ensures uniform distribution of pressurized air about the circumference of mid-section 24. Subsequently, as disclosed in U.S. patent application Ser. No. 12/654,173, a vacuum/resistance of 20 inches of mercury at 20 lpm is created in the space between the inner surface of the protective mask and the outer surface of shell G, to evacuate any excess fluid between the protective mask and the outer surface of test head E. It will be readily appreciated that due to the design of test head B it may be possible to eliminate the inflation/deflation feature and thereby eliminate conduit E, hose assembly 40, port 38 and fluid pathway 42.

Referring to FIG. 5, lower portion 44 of section 24 includes internal threads mating with external threads of upper portion 46 of section 26 to removably connect section 24 to section 26. While threads are the preferred means for securing section 24 to section 26, any suitable fastening device may be used. Section 26 may be removably connected to bottom section 6 via detents or any other suitable fastener. Alternatively, section 26 may be removably connected to base C with any suitable fastener. An annular ring type seal 48 surrounds portion 46 to provide a fluid tight connection between section 24 and section 26.

Referring to FIGS. 2, 6 and 7, fluid pathway 50 formed in portion 30 of section 26 connects test space 20 to conduit F. Preferably, when the preferred form of the test head assembly A is connected to a mask tester and the mask tester is in the test mode (i.e., when the protective mask is being tested for leaks), the mask tester creates a vacuum between the inner surface of the protective mask and the outer surface of test head B and thereby pulls a test fluid from test space 20 through fluid pathway 50 and conduit F to the mask tester for analysis. The analysis may take the form of analyzing the fluid from test space 20 by a photometer, a CNC device or other particle analyzer housed in the mask tester to determine the concentration of aerosol present in the test fluid while the outer surface of the protective mask is subjected to an aerosol. As previously explained, the test head assembly may be used with mask testers employing testing techniques other than challenge concentration analysis.

Referring to FIGS. 2, 5 and 6, hose assembly 52, fluid pathway 54 formed in section 26 and conduit D supply clean air to test space 20 when the protective mask is being tested. It should be noted that the clean air could be supplied to test space 20 through fluid pathway 50 and conduit F. In this instance, the fluid test sample would be provided to the mask tester through hose assembly 52, fluid pathway 54 and conduit D.

By forming the inner core H and outer shell G from multiple sections one can readily modify the size of the test head B without replacing the test head B in its entirety. For example, by simply replacing mid-section 4 of outer shell G and mid-section 24 of inner core H with mid-sections of half the size of the existing mid-sections, the size of the test head B may be readily and substantially altered.

Figure 8:
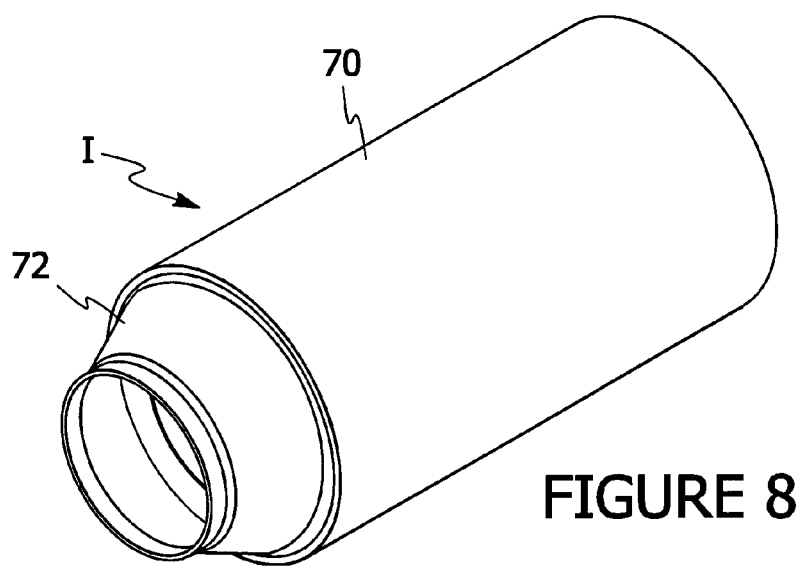
FIG. 8 is a perspective view of a preferred form of optional test shroud that may be used with the test head assembly illustrated in FIG. 1.
Figure 9:
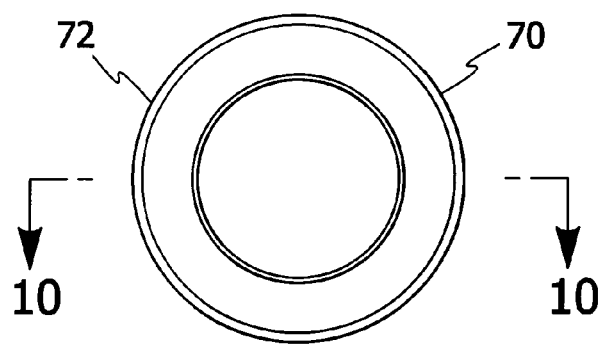
FIG. 9 is an end view of the optional test shroud illustrated in FIG. 9.
Figure 10:
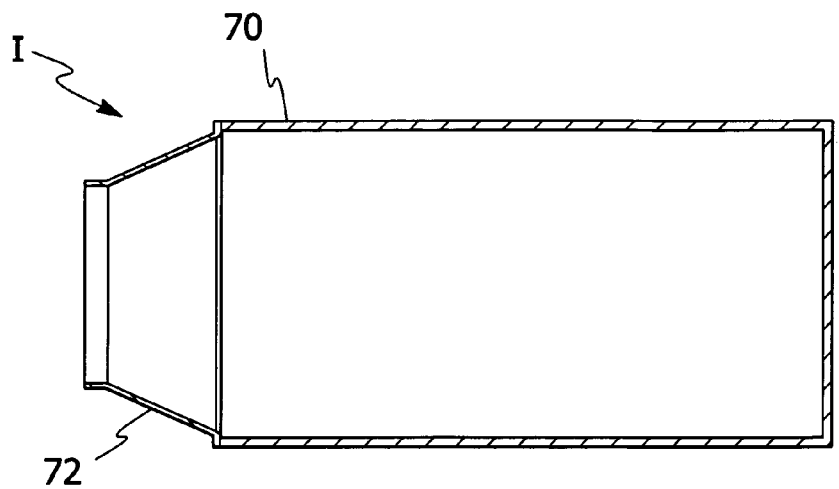
FIG. 10 is a cross-sectional view of the optional test shroud taken along lines 10-10 in FIG. 9.

FIGS. 8 Through 10

An optional test shroud/perfect mask that may be used in connection with the preferred form of the test head assembly will now described with references to FIGS. 8-10.

The perfect mask/test shroud I is designed to allow a mask tester to be readily checked to make sure that the mask tester is not erroneously detecting a leak. More specifically, the perfect mask/test shroud I is designed to be free of any leaks. It is further designed so that it can be readily mounted on test head B illustrated in FIG. 1 in a fluid tight manner. The phrases "perfect mask" and "test shroud" as used herein do not encompass a mask that can be worn by an individual to protect the individual from one or more harmful agents. Test shroud I includes a body portion 70 and a necked or stepped down portion 72. Preferably, the outer surface of portion 70 is formed from a closed cell foam neoprene and the inner surface is formed from a material having a low coefficient of friction. In the most preferred form, the inner surface of portion 70 is formed from cloth. Portion 72 is formed from latex. Preferably, all seams of test shroud I including the seam between portion 70 and portion 72 are constructed with glue and tape and entirely free from stitching.

To ensure that a mask tester is not erroneously detecting leaks, the test shroud is mounted on test head B. The mask tester is then operated in a test mode to determine if a leak is present. If the mask tester detects a leak, the operator will know that the mask tester needs to be serviced.

While this invention has been described as having a preferred design, it is understood that the preferred design can be further modified or adapted following in general the principles of the invention and including but not limited to such departures from the present invention as come within the known or customary practice in the art to which the invention pertains. The claims are not limited to the preferred embodiment and have been written to preclude such a narrow construction using the principles of claim differentiation.

We claim:

1. An apparatus for use in testing a protective mask for leaks, said apparatus comprising:
   (a) a test head assembly for supporting at least a portion of a protective mask to be tested for leaks; and,
   (b) said test head assembly including a test head on which the protective mask being tested is mounted, said test head having an outer circumferential surface, an inner surface and a test space formed between said outer circumferential surface and said inner surface, said test space being generally coextensive with an interior of the protective mask being tested said outer circumferential surface having at least one opening for allowing fluid located about said outer circumferential surface to flow into said test space, said test head having a fluid pathway, said fluid pathway being in fluid communication with said test space at one end and in fluid communication with a mask testing device at an other end to allow fluid in said test space to be directed through said fluid pathway to the mask testing device for analysis to determine if a leak exits in the protective mask being tested.

2. An apparatus as set forth in claim 1, wherein:
   (a) said test space is substantially silo-shaped.

3. An apparatus as set forth in claim 1, wherein:
   (a) said test head has a hollow cavity, said inner surface substantially surrounds said hollow cavity.

4. An apparatus as set forth in claim 3, wherein:
   (a) said test space substantially surrounds said hollow cavity; and,
   (b) at least first and second conduits operably associated with the mask testing device, at least a portion of said first and second conduits extend into said hollow cavity and are in fluid communication with said test space.

5. An apparatus for use in testing a protective mask for leaks, said apparatus comprising:
   (a) a test head assembly for supporting at least a portion of a protective mask to be tested for leaks; and,
   (b) said test head assembly including a body having an outer circumferential surface, an inner surface and a test space formed between said outer circumferential surface and said inner surface, said outer circumferential surface substantially surrounding said test space, said test space substantially surrounding said inner surface, said outer circumferential surface having at least one opening for allowing fluid located about said outer circumferential surface to flow into said test space, said body having a fluid pathway, said fluid pathway being in fluid communication with said test space at one end and in fluid communication with a mask testing device at the other end to allow fluid in said test space to be directed through said fluid pathway to the mask testing device for analysis to determine if a leak exits in the protective mask being tested; and,
   (c) said test space has a thickness of less than ⅛ of an inch.

6. An apparatus for use in testing a protective mask for leaks, said apparatus comprising:
   (a) a test head assembly for supporting at least a portion of a protective mask to be tested for leaks; and,
   (b) said test head assembly including a body having an outer circumferential surface, an inner surface and a test space formed between said outer circumferential surface and said inner surface, said outer circumferential surface substantially surrounding said test space, said test space substantially surrounding said inner surface, said outer circumferential surface having at least one opening for allowing fluid located about said outer circumferential surface to flow into said test space, said body having a fluid pathway, said fluid pathway being in fluid communication with said test space at one end and in fluid communication with a mask testing device at the other end to allow fluid in said test space to be directed through said fluid pathway to the mask testing device for analysis to determine if a leak exits in the protective mask being tested; and, (c) said outer circumferential surface of said body is formed from a material having a low coefficient of friction.

7. An apparatus as set forth in claim 6, wherein:
(a) said outer circumferential surface of said body is formed from polyoxymethylene.

8. An apparatus for use in testing a protective mask for leaks, said apparatus comprising:
(a) a test head assembly for supporting at least a portion of a protective mask to be tested for leaks; and,
(b) said test head assembly including a test head about which a protective mask is mounted for testing the protective mask for leaks, said test head having a generally tubular mid-section forming an outermost surface of said test head, said test head having a hollow cavity, said test head further including a test space being disposed between said outermost surface and said hollow cavity, said test space substantially surrounds said hollow cavity.

9. An apparatus for use in testing a protective mask for leaks, said apparatus comprising:
(a) a test head assembly for supporting at least a portion of a protective mask to be tested for leaks;
(b) said test head assembly including a body about which a protective mask is mounted for testing the protective mask for leaks, said body having a generally tubular mid-section having an outer surface, said body having a hollow cavity, said body further including a test space being disposed between said outer surface and said hollow cavity; and,
(c) said outer surface of said generally tubular mid-section includes a plurality of openings in fluid communication with said test space.

10. An apparatus as set forth in claim 9, wherein:
(a) said body includes a generally dome-shaped upper section.

11. An apparatus as set forth in claim 10, wherein:
(a) said generally tubular mid-section and said generally dome-shaped upper section are removably attached to said test head assembly.

12. An apparatus for use in testing a protective mask for leaks, said apparatus comprising:
(a) a test head assembly for supporting at least a portion of a protective mask to be tested for leaks; and,
(b) said test head assembly including a test head having an outermost shell, an inner core and a test space formed between said outermost shell and said inner core, said outermost shell having a hollow cavity, said outermost shell being removably mounted about said inner core, said test space being disposed directly adjacent and generally coextensive with an interior surface of said outermost shell.

13. An apparatus as set forth in claim 12, wherein:
(a) said outer shell includes a first section and a second section, said first section is removably attached to said second section, said first section forms an uppermost portion of said test head, said second section is substantially cylindrical.

14. An apparatus as set forth in claim 13, wherein:
(a) said outer shell further includes a third section removably attached to said second section, said second section being disposed between said first section and said third section.

15. An apparatus as set forth in claim 14, wherein:
(a) said third section includes an inwardly stepped portion about which a seal of a neck seal type protective mask is secured during testing of the neck seal type protective mask.

16. An apparatus as set forth in claim 14, wherein:
(a) each of said first section, said second section and said third section include a plurality of openings in fluid communication with said test space.

17. An apparatus as set forth in claim 12, wherein:
(a) said inner core includes a first section and a second section, said first section of said inner core is removably attached to said second section of said inner core.

18. An apparatus as set forth in claim 17, wherein:
(a) said inner core includes a third section, said second section of said inner core is removably attached to said third section of said inner core.

19. An apparatus for use in testing a protective mask for leaks, said apparatus comprising:
(a) a test head assembly including a test head for supporting at least a portion of a protective mask to be tested for leaks, said test head having an outer surface on which the protective mask being tested is mounted, said test head further having at least a first section and a second section, said second section being substantially tubular and removably attached so that said second section can be readily removed from said test head assembly and replaced with a different test head section having at least one dimension different from said second section such that the size of said outer surface of said test head can be readily varied to accommodate protective masks of different sizes.

20. An apparatus as set forth in claim 19, wherein:
(a) said first section is generally dome-shaped and removably attached to said second section, said first section forms an uppermost portion of said test head, said test head having a test space, each of said first section and said second section include a plurality of openings in fluid communication with said test space.

21. An apparatus as set forth in claim 20, wherein:
(a) said test space includes an annular portion that extends along substantially the entire length of said second section.

22. An apparatus as set forth in claim 21, wherein:
(a) said test head includes an inner surface, said annular portion surrounds said inner surface of said test head.

23. An apparatus as set forth in claim 19, wherein:
(a) said test head and said test space are substantially silo-shaped.

24. An apparatus for use in testing a protective mask for leaks, said apparatus comprising:
(a) a test head assembly including a body for supporting at least a portion of a protective mask to be tested for leaks, said body having at least a first section and a second section, said second section being substantially tubular and removably attached so that said second section can be readily removed from said test head assembly and replaced with a different body section having at least one dimension different from said second section such that the size of said body can be readily varied; and
(b) said test head assembly includes a test shroud devoid of leaks for enabling a user to determine if a mask testing device is falsely detecting leaks, said test shroud is incapable of functioning as a protective mask for an individual, said test shroud is configured to be mounted about said body in a fluid tight manner.

25. An apparatus as set forth in claim 24, wherein:
(a) said test shroud includes a substantially cylindrical portion and a necked down portion, said substantially cylindrical portion encloses more than half of said body, said necked down portion is formed from a material that when secured to said body forms a fluid tight seal.

26. An apparatus as set forth in claim 25, wherein:
(a) said substantially cylindrical portion is formed from a closed cell foam neoprene and said necked down portion is formed from latex.

* * * * *